M. J. GILBERT.
Thrashing Machine and Corn Sheller.
No. 577.
Patented Jan'y 20, 1838.
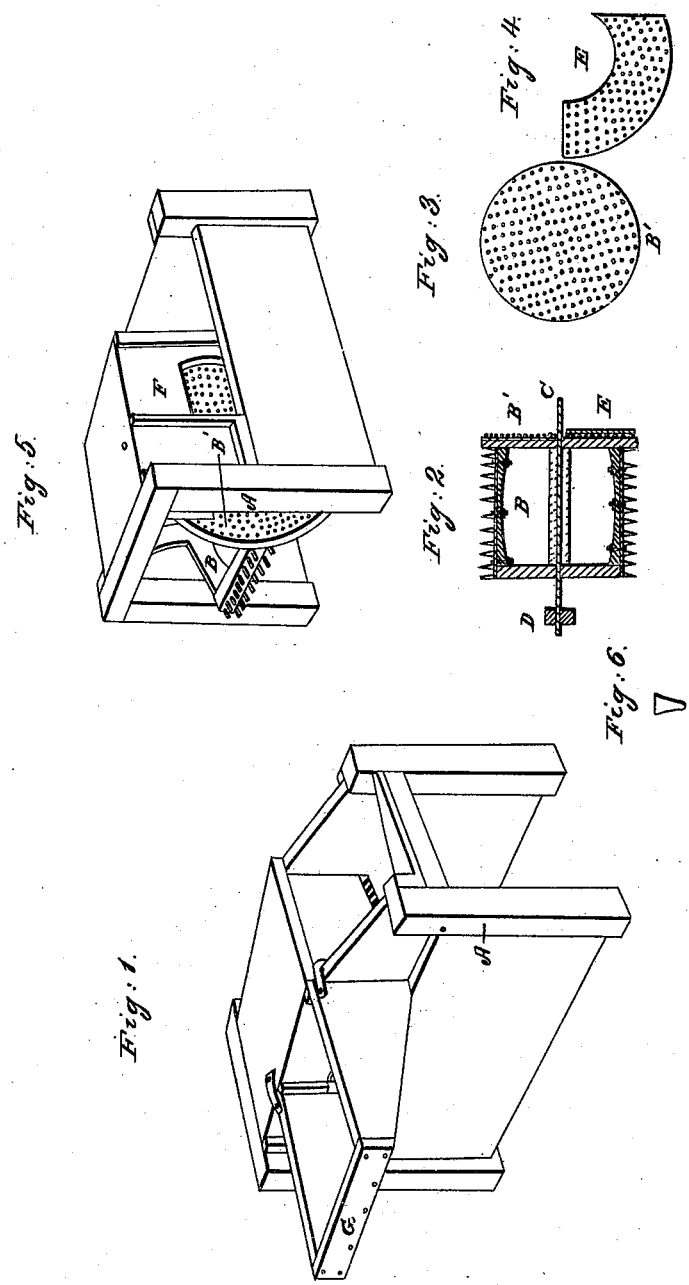

UNITED STATES PATENT OFFICE.

MYRON I. GILBERT, OF TROY, NEW YORK.

MACHINE FOR THRESHING GRAIN AND SHELLING CORN.

Specification of Letters Patent No. 577, dated January 20, 1838.

*To all whom it may concern:*

Be it known that I, MYRON I. GILBERT, of the city of Troy, in the county of Rensselaer and State of New York, have invented a new and useful Machine for Threshing Grain and Shelling Corn at One Operation, which is described as follows, reference being had to the annexed drawings of the same, making part of this specification.

The frame A Figures 1 and 5 of this machine consists of four posts, cross pieces, side pieces and cap, framed together forming a frame of sufficient size and strength to contain and support the threshing cylinder and shelling wheel, shelling plate, concave, and hoppers.

The threshing cylinder and shelling wheel B, Figs. 2, 3 and 5, are cast together in one entire piece, except the teeth of the former, which are made of wrought iron and fixed in plates secured to the arms of the threshing cylinder by screw bolts.

One end of the threshing cylinder is made solid forming the shelling wheels B', for shelling corn, rough on its outer surface or armed with teeth of a suitable shape for shelling off the corn from the cob with the greatest facility. The other end of the cylinder consists of four arms crossed at right angles. The teeth of the threshing cylinder are similar to others in use.

The cylinder and wheel are fixed on a horizontal axle C passing through the center of the same turning in boxes in the sides thereof having a pulley D on one end.

The concave is constructed similar to those in other threshing machines with ribs furnished with teeth between which the teeth of the cylinder revolve. The hopper is constructed like other hoppers of threshing machines. The shelling plate E Figs. 2 and 4 is cast the segment of a circle with teeth shaped similar to that represented at Fig. 6 and is bolted to the inside of the frame opposite the face of the shelling wheel—a space being left between the two equal to the size of the ear of corn passing between them. The lower end of said plate where the cob is discharged is brought nearer to the shelling wheel than the upper end where the ear of corn is admitted.

An opening F Fig. 5 is made in the side of the frame for the admission of the ears to the shelling wheel and plate, against which is constructed an inclined hopper G Fig. 1 for conducting the ears placed therein to said aperture.

In threshing the grain from the straw by the cylinder and concave the operation is similar to other threshing machines.

In shelling corn the ears are put into the hopper which conducts them through the opening in the side of the frame to and between the shelling wheel and plate where the corn is taken from the cob by the teeth in the wheel and plate—the former being turned by means of a band conveying the power from the driving machine to the pulley on the axle of the cylinder and wheel. In shelling large ears the teeth of the shelling wheel will sink into the cob and thus prevent the breaking or stopping of the machine, without the use of springs behind the shelling plate.

By combining and arranging the threshing machine and corn sheller in one frame not only will much room be saved but a great degree of additional strength will be imparted to each other and expense will be saved.

The same power will also drive the two parts of the machine—the shelling wheel acting as a fly wheel to the threshing machine and the threshing cylinder as a fly wheel to the shelling wheel.

The invention claimed by me the said MYRON I. GILBERT, and which I desire to secure by Letters Patent consists, 1. In the mode of constructing the threshing cylinder and shelling wheel as before described—being cast in one piece.

2. The combination and arrangement of the threshing cylinder and concave with the shelling wheel, and segment plate in one frame for threshing grain and shelling corn at one operation, as above described.

MYRON I. GILBERT.

Witnesses:
WM. P. ELLIOT,
WM. BISHOP.